United States Patent
Andonian et al.

(10) Patent No.: US 9,212,704 B2
(45) Date of Patent: *Dec. 15, 2015

(54) ELECTROMAGNETICALLY ACTUATED CLUTCH

(75) Inventors: Brian J. Andonian, Plymouth, MI (US); Jihong Guo, Ann Arbor, MI (US); Yasser Hindi, Dearborn, MI (US); Dennis W. Isken, II, Frankenmuth, MI (US); Jacob M. Povirk, Franklin, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 829 days.

This patent is subject to a terminal disclaimer.

(21) Appl. No.: 13/454,305

(22) Filed: Apr. 24, 2012

(65) Prior Publication Data

US 2013/0277165 A1 Oct. 24, 2013

(51) Int. Cl.
*F16D 27/118* (2006.01)
*F16H 48/34* (2012.01)
*F16H 48/08* (2006.01)
*F16H 48/24* (2006.01)

(52) U.S. Cl.
CPC ............. *F16D 27/118* (2013.01); *F16H 48/08* (2013.01); *F16H 48/24* (2013.01); *F16H 48/34* (2013.01); *F16H 2048/346* (2013.01)

(58) Field of Classification Search
CPC ............... F16D 27/108; F16D 27/118; F16H 2048/346; F16H 48/34
USPC ............................................. 192/84.7, 84.92
See application file for complete search history.

(56) References Cited

U.S. PATENT DOCUMENTS

| | | | | |
|---|---|---|---|---|
| 828,647 | A * | 8/1906 | Gibbs | 192/84.91 |
| 3,732,752 | A * | 5/1973 | Louckes | F16H 48/24 475/150 |
| 5,030,181 | A * | 7/1991 | Keller | B60K 17/20 192/84.92 |
| 5,085,305 | A * | 2/1992 | Cheng | 192/69.82 |
| 5,350,340 | A * | 9/1994 | Paul | B60K 17/3462 475/231 |
| 6,446,772 | B1 * | 9/2002 | Inose et al. | 192/35 |
| 6,945,895 | B2 * | 9/2005 | Fusegi et al. | 475/150 |
| 8,454,471 | B2 * | 6/2013 | Isken et al. | 475/231 |
| 2005/0070395 | A1 * | 3/2005 | DeGowske | F16H 48/08 475/230 |
| 2010/0236888 | A1 * | 9/2010 | Pritchard et al. | 192/35 |
| 2012/0021862 | A1 * | 1/2012 | Isken et al. | 475/150 |

* cited by examiner

*Primary Examiner* — Robert Hodge
*Assistant Examiner* — Terry Chau
(74) *Attorney, Agent, or Firm* — James Dottavio; MacMillan, Sobanski & Todd, LLC

(57) ABSTRACT

A clutch mechanism includes a coil of wire for producing an electromagnetic field, a locking ring secured against rotation within a case or housing, a gear engageable with the locking ring, and a lever that pivots in response to the electromagnetic field produced by energizing the coil causing the locking ring to engage the gear and hold the gear against rotation.

17 Claims, 4 Drawing Sheets

ELECTROMAGNETICALLY ACTUATED CLUTCH

BACKGROUND OF THE INVENTION

1. Field of the Invention

This invention relates generally to a dog clutch actuation mechanism, and more particularly to a locking differential mechanism for a motor vehicle axle.

2. Description of the Prior Art

Rotating components often require a clutch to transfer torque and rotation from one rotating component to another. The clutch member can be a friction plate or dog clutch, which does not allow any slipping between rotating components during engagement.

Common automotive applications of torque transfer clutches include transmissions, transfer cases, air conditioner compressors, power take-offs and many others. Torque transfer clutches are also commonly used in non-automotive applications such as industrial motors, conveyors, agricultural equipment and lawn mowing equipment. The torque transfer clutches can be engaged via compressed air, hydraulic fluid, mechanical leverage or magnetic actuation.

Many electronically-controllable torque transfer clutch use an electromagnetic coil to actuate the locking mechanism. When a small moveable coil is used to engage a dog-clutch locking mechanism, the magnetic force it is capable of generating as a function of the air gap is also small. Therefore, it is necessary to amplify the coil's movement to provide a larger displacement of the locking mechanism.

A need exists for a mechanism that amplifies axial displacement of the coil, such as a lever mechanism, which provides the locking mechanism, such as a dog clutch, to operate over a large displacement stroke.

SUMMARY OF THE INVENTION

A clutch mechanism includes a coil of wire for producing an electromagnetic field, a locking ring secured against rotation, a gear engageable with the locking ring, and a lever that pivots in response to the electromagnetic field produced by energizing the coil causing the locking ring to engage the gear and hold the gear against rotation.

Due to the mechanical advantage produced by use of the levers, the strength of the electromagnetic field produced by the coil is reduced in comparison to conventional applications, allowing use of a smaller coil, having less copper, lower weight, and a much smaller package size.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
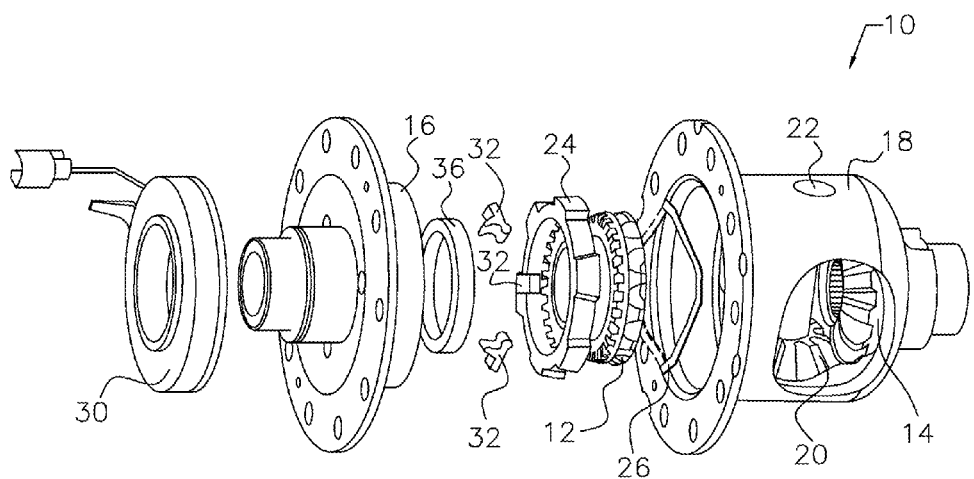
FIG. 1 is an exploded, perspective side view of a moving coil electromagnetic dog clutch applied for use in an automotive axle differential mechanism.
Figure 2:
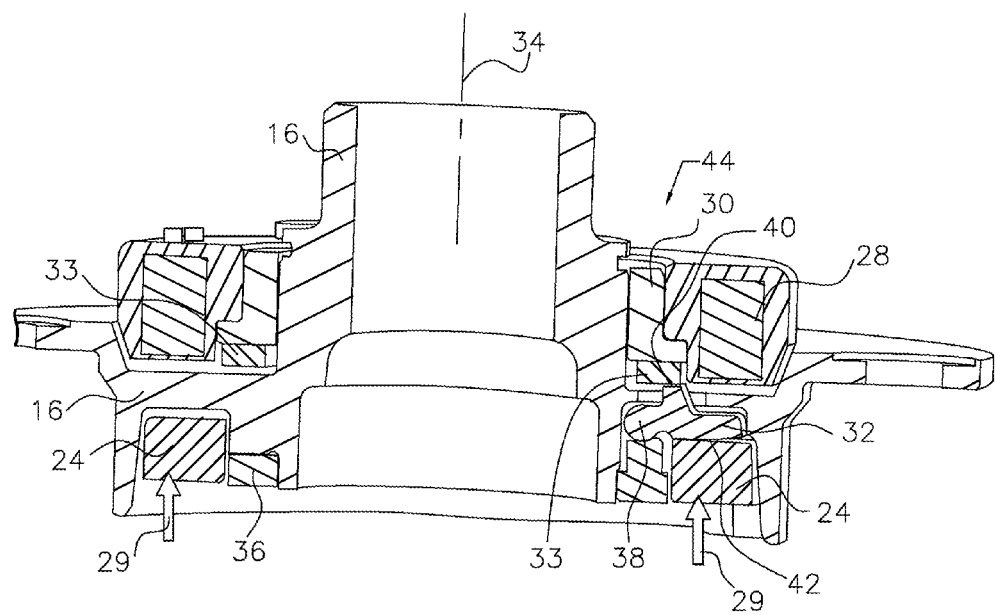
FIG. 2 is cross section taken through a diametric plane of a differential case and coil showing the initial air gap.

Referring now to the drawings, there is illustrated in FIG. 1 a rear axle locking differential mechanism 10, in which one or more of the side gears 12, 14 is selectively rotationally fixed to a differential case housing 16. The description refers to side gear 12 being secured against rotation to the left-hand case 16, but either side gear 12, 14 could be secured selectively to either the right-hand case 18 or the left-hand case 16. The gear teeth of the right-hand side gear 14 are engaged with the gear teeth of one of the bevel pinions 20. A pinion shaft 22, which extends through the walls of case 18, supports the bevel pinions 20 in rotation about the cylindrical surface of the pinion shaft 22.

A locking ring 24, rotationally fixed to case 16, can move axially within the differential case 16.

A return spring 26, located between the locking ring 24 and a spring seat in the right-hand case 18, provides an elastic force 29, which keeps the locking ring 24 disengaged from the side gear 12 when an electromagnetic coil 28, located in a coil assembly 30, is de-energized.

When coil 28 is energized, electric current flows through the coil windings producing a magnetic force, which acts on the LH differential case 16 moving the coil axially and pulling the coil towards the LH diff case 16.

Three levers 32, spaced angularly about axis 34 and located within the LH diff case 16, are retained by a circular retainer ring 36. The three levers 32 can each pivot about their own axis 38, but are fixed to the LH diff case 16 in the other directions. The levers 32 contact the thrust bearing 33 at the upper cam surface 40 and the locking ring 24 at the lower cam surface 42, the cam surfaces being formed on the levers 32.

Figure 3:
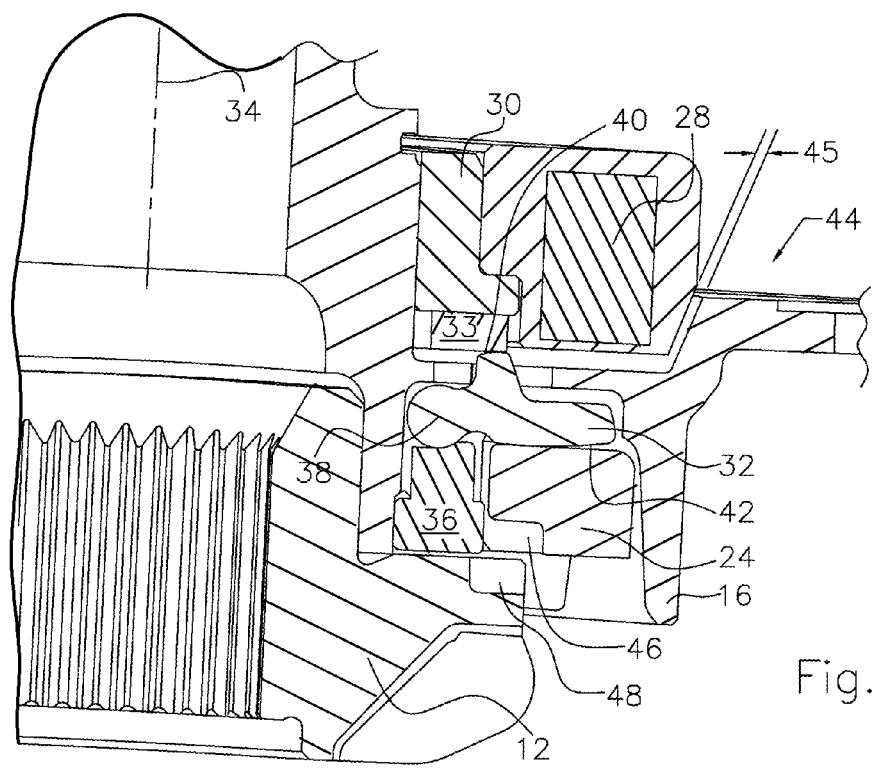
FIG. 3 is a cross section showing the clutch actuation mechanism in position with the coil de-energized and the clutch released.
Figure 4:
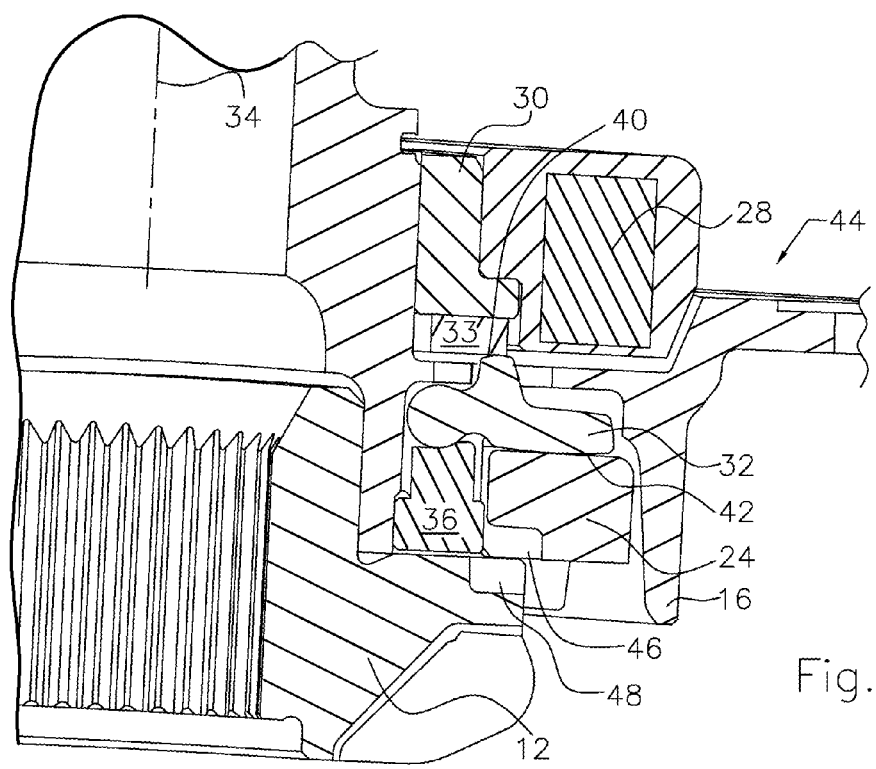
FIG. 4 is a cross section showing the clutch actuation mechanism with the coil energized and the mechanism at the mid-stroke of its axial displacement toward the side gear.
Figure 5:
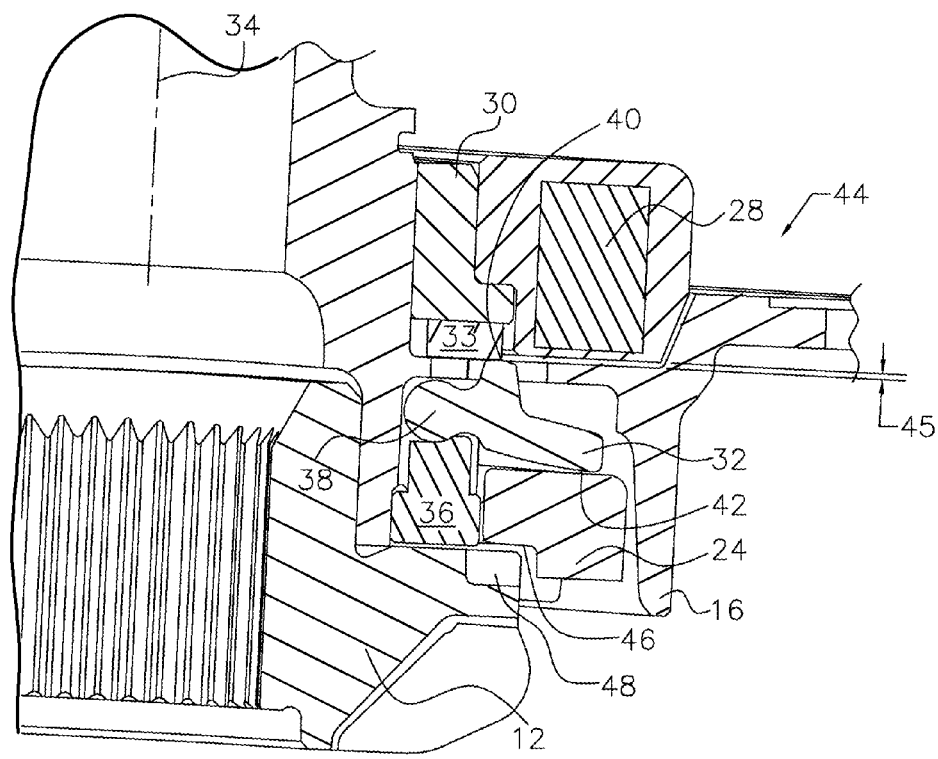
FIG. 5 is a cross section showing the coil energized and the clutch mechanism at the end of its engagement stroke fully locked with the dog teeth of locking ring engaged with the dog teeth of the side gear.
Figure 6:
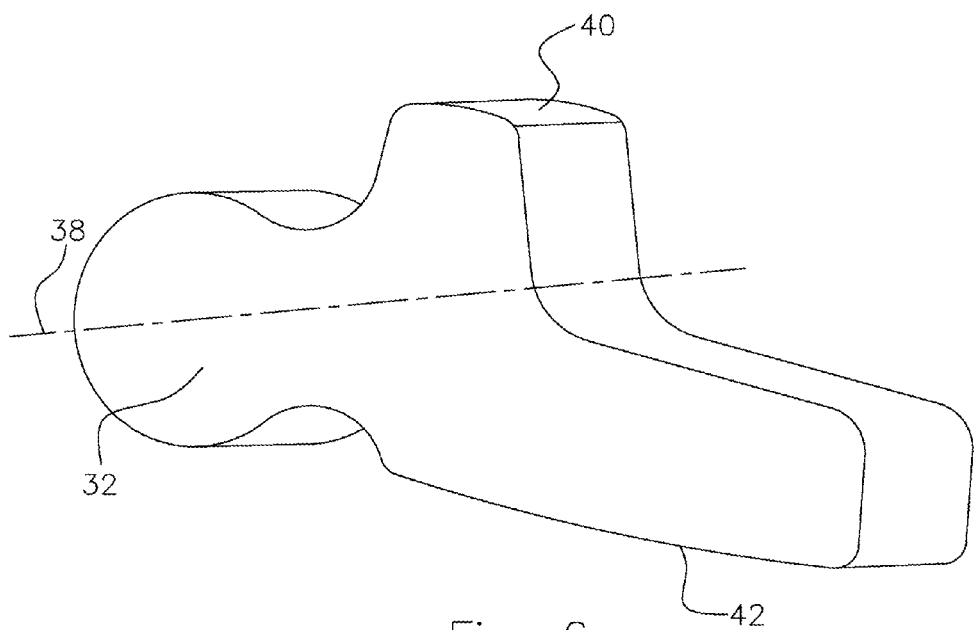
FIG. 6 is a perspective view of a lever.

FIG. 3 shows the clutch actuation mechanism 44 with the coil de-energized, the air gap 45 between the coil 28 and the adjacent surface of the case 16 at a maximum, and the clutch disengaged. FIG. 4 shows the clutch actuation mechanism 44 with the coil energized and the mechanism 44 at mid-stroke in the axial direction toward side gear 12. FIG. 5 shows the clutch actuation mechanism 44 with the coil energized and the mechanism 44 at the end of its engagement stroke in the fully locked state with the dog teeth 46 of locking ring 24 engaged with the dog teeth 48 of the side gear 12.

When coil 28 is energized, the coil moves toward the LH diff case 16 and its axial motion is transmitted to the locking ring 24 through the levers 32. Displacement of the locking ring 24 is a function of the coil displacement and the surface profile of the upper and lower cam surfaces 40, 42. Displacement of the locking ring 24 is, in general, nonlinear as shown in FIG. 7.

Figure 7:
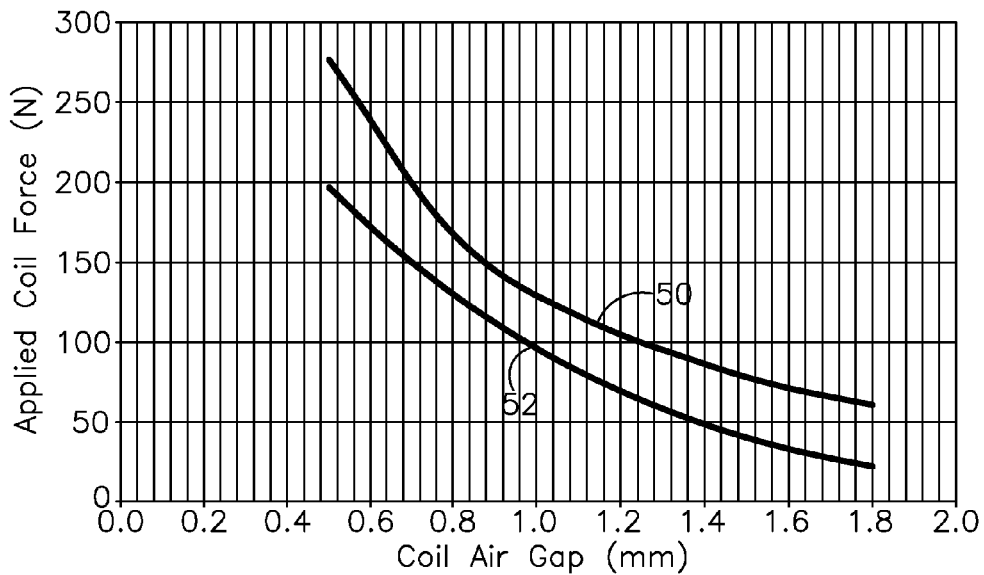
FIG. 7 is a graph showing the variation of the axial force generated by coil as a function of coil air gap, and the force required by the coil to overcome the return spring force.

FIG. 7 is a graph showing the variation of the axial force 50 generated by coil 28 as a function of coil air gap 45, and the force 52 required by the coil to overcome the return spring force 29. The total locking ring displacement can be significantly larger than the total coil displacement, thus a smaller initial coil air gap 45 can be used. Since the initial coil air gap 45 is small, the size of the coil 28 can also be small resulting in less copper or another electric conductor.

When the teeth 46 of the locking ring 24 mesh with the teeth 48 on the back face of the side gear 12, the side gear cannot rotate with respect to the case 16, because the locking ring is secured to the case against rotation. Then the differential 10 is in a locked state. When the coil 28 is de-energized, the return spring 26 provides an axial force 29 on the locking ring 24 moving the locking ring out of meshing engagement with the side gear 12. The return spring force 29 exerted on the coil 28 is amplified as a result of the lever multiplication obtained through the upper and lower cam surfaces 40, 42 of the lever element.

Figure 8:
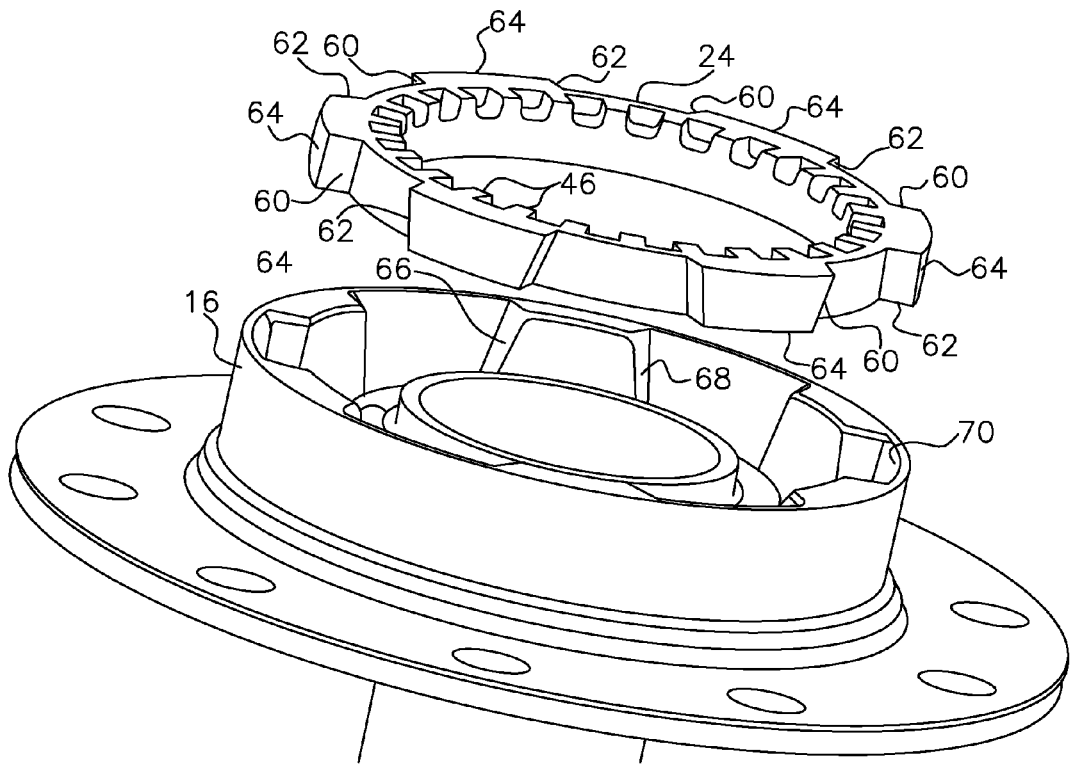
FIG. 8 is an exploded, perspective side view showing angled surface on the locking ring and differential case.

A mechanical retention feature keeps the locking ring 24 in mesh with the side gear 12 when the coil is energized. As FIG. 8 illustrates, angled surfaces 60, 62 are formed on each radial leg 64 of the locking ring, and angled surfaces 66, 68 are formed on each mating recess 70 of the case 16. The locking ring 24 is secured to case 16 against rotation by fitting each radial leg 64 in one of the recesses 70, the differential case 16 being bolted to the vehicle structure.

When torque is applied to lock ring 24 due to its engagement with the side gear 12, contact between the inclined surfaces 60, 62 of the locking ring 24 with inclined surfaces 66, 68 of the case recesses 70 produces a force applied at the case and having an axial component. This axial force component keeps the lock ring teeth 46 in tight meshing engagement with the side gear teeth 48, whenever torque is transmitted between the side gear 12 and locking ring 24.

In accordance with the provisions of the patent statutes, the preferred embodiment has been described. However, it should be noted that the alternate embodiments can be practiced otherwise than as specifically illustrated and described.

The invention claimed is:

1. A clutch mechanism, comprising:
a case;
a locking ring rotationally secured to the case;
an electromagnetic coil axially slidable toward the locking ring when energized;
a gear;
a lever that pivots in response to the sliding of the coil causing the locking ring to move a greater axial distance than the coil for all positions of the lever and to selectively engage the gear and hold the gear rotationally secured to the case.

2. The clutch mechanism of claim 1, wherein:
the locking ring includes first clutch teeth;
the gear includes second clutch teeth engageable with the first clutch teeth as the locking ring moves axially when the coil is energized and the lever pivots.

3. The clutch mechanism of claim 1, further comprising:
the locking ring being displaceable axially with respect to the gear and the case.

4. The clutch mechanism of claim 1, further comprising a spring for urging the locking ring out of engagement with the gear.

5. The clutch mechanism of claim 4, wherein a force applied to actuate the lever when the coil is energized is greater than a force required to overcome a force produced by the spring.

6. The clutch mechanism of claim 1, wherein:
the lever is supported to pivot about an axis disposed normal to a longitudinal axis and spaced radially from the longitudinal axis, contacts a coil assembly containing the coil at a first distance from the pivot axis, and contacts the locking ring at a second distance from the pivot axis greater than the first distance for all positions of the lever.

7. The clutch mechanism of claim 1, further comprising:
second and third levers angularly spaced with the lever about a longitudinal axis, each of the levers being supported to pivot about an axis disposed normal to the longitudinal axis and spaced radially from the longitudinal axis.

8. The clutch mechanism of claim 1, wherein
the locking ring includes first surfaces inclined with respect to a longitudinal axis; and
the case includes second surfaces substantially parallel to the first surfaces and engageable with the first surfaces when the locking ring is engaged with the gear, inclination of the first and second surfaces and a reaction to torque transmitted by the locking ring to the case producing a force on the locking ring tending to move the locking ring toward the gear.

9. The clutch mechanism of claim 1, wherein
the locking ring includes legs spaced angularly about a longitudinal axis, the legs including first surfaces inclined with respect to the longitudinal axis; and
the case includes recesses spaced angularly about a longitudinal axis, each recess sized to receive one of the legs therein, second surfaces being substantially parallel to the first surfaces and engageable with the first surfaces when the locking ring is engaged with the gear, inclination of the first and second surfaces and a reaction to torque transmitted by the locking gear to the case producing a force on the locking ring tending to move the locking ring toward the gear.

10. A clutch mechanism, comprising:
a case;
a gear supported for rotation on the case, including first clutch teeth;
an electromagnetic coil assembly containing a coil axially slidable when the coil is energized;
a locking ring rotatably secured to the case, including second clutch teeth;
a lever, having a cam extending through the case into contact with a thrust bearing that contacts the coil, pivotable in response to sliding of the coil, causing the first and second teeth to engage mutually and hold the gear against rotation relative to the case.

11. The clutch mechanism of claim 10, wherein the locking ring is displaceable axially with respect to the gear and the case.

12. The clutch mechanism of claim 10, further comprising a spring for urging the first and second teeth away from mutual engagement.

13. The clutch mechanism of claim 12, wherein a force applied to actuate the lever when the coil is energized is greater than a force required to overcome a force produced by the spring.

14. The clutch mechanism of claim 10, wherein:
the lever is pivotably supported about an axis disposed normal to a longitudinal axis and spaced radially from the longitudinal axis, contacts the coil assembly containing the coil at a first distance from the pivot axis, and contacts the locking ring at a second distance from the pivot axis greater than the first distance for all positions of the lever.

15. The clutch mechanism of claim 10, further comprising:
second and third levers angularly spaced with the lever about a longitudinal axis, each of the levers being supported to pivot about an axis disposed normal to the longitudinal axis and spaced radially from the longitudinal axis.

16. The clutch mechanism of claim 10, wherein:
the locking ring includes first surfaces inclined with respect to a longitudinal axis; and
the case includes second surfaces substantially parallel to the first surfaces and engageable with the first surfaces when the locking ring is engaged with the gear, inclination of the first and second surfaces and a reaction to torque transmitted by the locking gear to the case producing a force on the locking ring tending to move the locking ring toward the gear.

17. The clutch mechanism of claim 10, wherein:
the locking ring includes legs spaced angularly about a longitudinal axis, the legs including first surfaces inclined with respect to the longitudinal axis; and
the case includes recesses spaced angularly about a longitudinal axis, each recess sized to receive one of the legs therein, second surfaces being substantially parallel to the first surfaces and engageable with the first surfaces when the locking ring is engaged with the gear, inclination of the first and second surfaces and a reaction to torque transmitted by the locking gear to the case producing a force on the locking ring tending to move the locking ring toward the gear.

* * * * *